United States Patent
Andersson et al.

(10) Patent No.: US 11,702,977 B2
(45) Date of Patent: Jul. 18, 2023

(54) INTERNAL COMBUSTION ENGINE AND A VEHICLE

(71) Applicant: VOLVO TRUCK CORPORATION, Gothenburg (SE)

(72) Inventors: Arne Andersson, Mölnlycke (SE); Albert Serra Dalmau, Angered (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/526,055

(22) Filed: Nov. 15, 2021

(65) Prior Publication Data

US 2022/0154671 A1 May 19, 2022

(30) Foreign Application Priority Data

Nov. 17, 2020 (EP) ..................................... 20207946

(51) Int. Cl.
*F02B 37/04* (2006.01)
*F02M 26/35* (2016.01)
(Continued)

(52) U.S. Cl.
CPC .............. *F02B 37/04* (2013.01); *F02B 33/06* (2013.01); *F02B 41/06* (2013.01); *F02B 43/10* (2013.01);
(Continued)

(58) Field of Classification Search
CPC ........ F02M 26/06; F02M 26/08; F02M 26/22; F02M 26/35; F02B 75/02;
(Continued)

(56) References Cited

U.S. PATENT DOCUMENTS

| 7,281,531 | B1 | 10/2007 | Fulton et al. |
| 2012/0073551 | A1 | 3/2012 | Branyon et al. |

(Continued)

FOREIGN PATENT DOCUMENTS

| JP | 6295487 B1 * | 3/2018 | |
| WO | WO 98/002653 A1 | 1/1998 | |
| WO | WO-2010039197 A1 * | 4/2010 | ............... F01N 3/20 |

OTHER PUBLICATIONS

Yao, Haichun & Sun, Bai-gang & Tian, Huayu & Luo, Qinghe & Tang, Hongyang. (2014). A Study of Hydrogen Internal Combustion Engine EGR System. SAE Technical Papers. 1. 10.4271/2014-01-1071. (https://www.researchgate.net/publication/288553168_A_Study_of_Hydrogen_Internal_Combustion_Engine_EGR_System).*

(Continued)

*Primary Examiner* — Ngoc T Nguyen
(74) *Attorney, Agent, or Firm* — Sage Patent Group

(57) ABSTRACT

An internal combustion engine includes
a four-stroke combustion cylinder assembly configured for combustion of hydrogen gas within at least one combustion chamber of the combustion cylinder assembly such as to drive a crankshaft of the engine,
an intake passage upstream of the cylinder assembly and an exhaust passage downstream of the cylinder assembly;
a displacement compressor arranged within the intake passage, the displacement compressor being configured for compression of intake gas,
an exhaust gas recirculation system configured for recirculating at least a portion of the exhaust from the exhaust passage to the displacement compressor.

14 Claims, 1 Drawing Sheet

(51) Int. Cl.
  *F02M 26/08*  (2016.01)
  *F02M 26/22*  (2016.01)
  *F02B 43/10*  (2006.01)
  *F02B 41/06*  (2006.01)
  *F02B 33/06*  (2006.01)
  *F02B 75/02*  (2006.01)

(52) U.S. Cl.
  CPC ............ *F02M 26/08* (2016.02); *F02M 26/22* (2016.02); *F02M 26/35* (2016.02); *F02B 2075/027* (2013.01)

(58) Field of Classification Search
  CPC .... F02B 2075/027; F02B 33/06; F02B 37/04; F02B 39/10; F02B 41/06; F02B 43/10
  See application file for complete search history.

(56) References Cited

U.S. PATENT DOCUMENTS

2015/0361927 A1* 12/2015 Glugla .................. F02B 37/007
  60/605.2
2019/0178152 A1   6/2019 Andersson et al.

OTHER PUBLICATIONS

Machine generated translation of JP 6295487 B1 obtained from EPO.org.*
Extended European Search Report, EP 20207946.3, dated Mar. 5, 2021, 6 pages.

* cited by examiner

INTERNAL COMBUSTION ENGINE AND A VEHICLE

CROSS REFERENCE TO RELATED APPLICATIONS

This application claims foreign priority to European Patent Application No. 20207946.3, filed on Nov. 17, 2020, the disclosure and content of which is incorporated by reference herein in its entirety.

TECHNICAL FIELD

The invention relates to an internal combustion engine and a vehicle.

The invention can be applied in heavy-duty vehicles, such as trucks, buses and construction equipment. Although the invention will be described with respect to a truck, the invention is not restricted to this particular vehicle, but may also be used in other vehicles such as buses, working machines and passenger cars. The invention may also be applied in vessels and in stationary applications.

BACKGROUND

Heavy-weight vehicles such as buses and trucks traditionally use internal combustion engines fuelled by diesel for powering the vehicle. In the ongoing strive to reduce carbon dioxide emissions, alternative power systems are now being developed, including electric power systems, engines powered by e.g. biofuels, and fuel cells using hydrogen gas as a fuel. Fuel cells are particularly attractive, thanks to that the only waste product formed during electricity generation apart from heat is water. However, fuel cells are rather costly and in a propulsion system of a vehicle, fuel cells are associated with drawbacks such as relatively high power transfer losses and lack of engine braking functionality. It is therefore desirable to develop competing hydrogen based power systems. A candidate for such a competing system is the hydrogen fuelled combustion engine. Such existing engines are however typically less efficient than fuel cells. In order to compete with fuel cell based power systems, it is therefore desirable to develop more efficient and clean combustion engines that are able to use hydrogen as a fuel.

Definitions

By a four-stroke combustion cylinder is herein intended a combustion cylinder housing a reciprocating combustion piston, the combustion piston having an intake stroke, a compression stroke, a combustion stroke and an exhaust stroke. When the combustion piston is travelling downwards during the intake stroke, towards a bottom dead centre of the combustion cylinder, compressed air is forced into a combustion chamber of the combustion cylinder. When the combustion piston is thereafter travelling upwards towards a top dead centre of the combustion cylinder, during the compression stroke, the gases in the combustion cylinder are compressed. Around the top dead centre, or slightly after the piston has reached the top dead centre, the combustion process is initiated. The combustion piston thereafter travels downwards towards the bottom dead centre for producing work of the piston—this is herein defined as the combustion stroke. Finally, when the combustion piston is again travelling upwards, during the exhaust stroke, exhaust gases are directed out from the combustion chamber.

A four-stroke combustion cylinder assembly as recited herein may comprise a plurality of such four-stroke combustion cylinders.

By a displacement compressor is intended a positive displacement compressor, including reciprocating displacement compressors as well as rotary displacement compressors. The positive displacement compressor compresses gas by using displacement of a mechanical linkage to reduce the volume of a space in which the gas is contained.

SUMMARY

An object of the invention is to provide an internal combustion engine which is able to use hydrogen gas as a fuel, and which is in at least some aspects improved with respect to prior art engines able to be powered by hydrogen gas.

According to a first aspect of the invention, the object is achieved by an internal combustion engine according to claim 1.

The internal combustion engine comprises:
- a four-stroke combustion cylinder assembly configured for combustion of hydrogen gas within at least one combustion chamber of the combustion cylinder assembly such as to drive a crankshaft of the engine,
- an intake passage upstream of the cylinder assembly and an exhaust passage downstream of the cylinder assembly;
- a displacement compressor arranged within the intake passage, the displacement compressor being configured for compression of intake gas,
- an exhaust gas recirculation system configured for recirculating at least a portion of the exhaust from the exhaust passage to the displacement compressor and
- an expander arranged in downstream fluid communication with the combustion chamber for receiving exhaust from the combustion chamber, the exhaust gas recirculation system being arranged in downstream fluid communication with the expander.

Since the proposed internal combustion engine is configured for combustion of hydrogen gas, the exhaust will comprise a large amount of water, together with nitrogen oxides (NOx), and nitrogen gas ($N_2$). By means of the exhaust gas recirculation system, EGR, the amount of NOx produced in the combustion process may be reduced. This is particularly useful when using a lean air-fuel mixture, since the combustion temperature is lowered thanks to the recirculated exhaust introduced into the combustion chamber. By providing a compressor arranged within the intake passage for compression of intake gas into the combustion chamber, efficiency and power density of the engine is improved. Turbo compressors are commonly used for this purpose in e.g. diesel engines, but are sensitive to condense, which may destroy the compressor wheel. The displacement compressor is much less sensitive to receiving condensed exhaust from the EGR system and remains functional also if condensed exhaust is fed into it. This makes it possible to cool the exhaust within the EGR system to a lower temperature than in an engine in which the exhaust from the EGR system would be fed directly to a turbo compressor. The amount of work that has to be carried out by the compressor is reduced thanks to the lower temperature, so that the energy efficiency of the engine is improved. The lower temperature also reduces the amount of NOx emissions.

The expander, used in combination with the displacement compressor, further increases the efficiency of the engine by allowing an increased flow of exhaust gases. It may be drivingly connected to the displacement compressor, but it is also possible to provide the expander separately from the displacement compressor.

The displacement compressor may be a piston compressor or a blower, such as a Roots blower. Preferably, the displacement compressor has a controllable volumetric efficiency in order to adapt to different load points and combustion modes of the engine.

The intake gas will in the internal combustion engine be a mixture of air and exhaust provided via the EGR system.

Optionally, the exhaust gas recirculation system comprises a heat exchanger for cooling of the exhaust. By cooling the exhaust, the work that the displacement compressor has to carry out is reduced, but on the other hand the cooling leads to the risk of introducing condensed exhaust into the compressor. However, as explained above, this is acceptable since a displacement compressor is used.

Optionally, the heat exchanger is configured for cooling the exhaust at least to the dew point of the exhaust. In other words, saturated exhaust is fed to the displacement compressor. In this case, a condensate may be formed in the exhaust gas recirculation system.

Optionally, the exhaust gas recirculation system is configured for feeding both condensed exhaust and exhaust gas from the heat exchanger to the displacement compressor. The exhaust gas recirculation system may in this case be configured for feeding all of the condensed exhaust, or only a portion of the condensed exhaust, to the displacement compressor.

Optionally, the exhaust gas recirculation system is configured for condensing and detracting at least a portion of the exhaust from the exhaust gas recirculation system prior to reaching the displacement compressor. In this case, the exhaust gas recirculation system may optionally be configured for recirculating only gaseous exhaust to the displacement compressor. This reduces the risk of corrosion within the displacement compressor. The condensed exhaust may be discarded or used for other purposes within the internal combustion engine.

Optionally, the internal combustion engine further comprises a turbo compressor provided downstream of the displacement compressor in the intake passage of the engine. A two-stage compression is thereby achieved, wherein the first stage compression takes place in the displacement compressor, thereby departing from the dew point, and the second stage compression takes place in the turbo compressor, i.e. a compressor wheel driven by a turbine wheel placed in the exhaust passage, without risking to introduce condensed exhaust into the turbo compressor. This makes it possible to further compress the intake gas prior to introduction into the combustion chamber, thereby further improving the energy efficiency of the engine. When a turbo compressor is provided, the expander may be connected to the turbo compressor. The expander may e.g. be provided as a turbine of the turbo compressor.

Optionally, the four-stroke combustion cylinder assembly is configured for the combustion of hydrogen gas using a lean air-fuel mixture. With a lean air-fuel mixture is intended a mixture comprising a larger proportion of air than a stoichiometric mixture. The efficiency of the engine can be increased at lean operating conditions thanks to the displacement compressor and the expander allowing a larger flow of exhaust gases, thereby maintaining the fuel flow and power density.

Optionally, the expander comprises a two-stroke expansion cylinder having an expansion piston drivingly connected to the crankshaft of the engine. The expander piston and a piston of the combustion cylinder assembly may in this case be connected, so that a movement of a first one of the pistons is associated with a predetermined movement of a second one of the pistons. Alternatively, another type of expander may be provided. The expansion piston may be connected to the crankshaft via intermediate component(s), e.g. via at least one connecting rod.

Optionally, the displacement compressor comprises a two-stroke compression cylinder having a compression piston drivingly connected to the crankshaft of the engine. Thus, the crankshaft may drive the compression piston, for example via at least one connecting rod or other intermediate component(s).

Optionally, the compression piston and the expansion piston are rigidly connected such as to move in unison. Such rigidly connected compression and expansion pistons, suitable for use in the present internal combustion engine, are described in WO 2018/166591.

Optionally, the internal combustion engine further comprises at least one fuel injector for injection of hydrogen gas into the at least one combustion chamber. The fuel injector may be configured for injection of hydrogen gas at a predetermined crank angle or crank angle interval such as to optimize the combustion process.

Optionally, the internal combustion engine further comprises an exhaust gas aftertreatment system. The exhaust gas aftertreatment system is in this embodiment arranged in downstream fluid communication with the combustion chamber for receiving exhaust gas therefrom. By providing an exhaust gas aftertreatment system, which may e.g. comprise a three-way catalytic converter, or a selective catalytic reduction (SCR) converter, efficient nitrogen oxide (NOx) reduction is achieved. In the case when the internal combustion engine is configured for using a lean air-fuel mixture, the exhaust aftertreatment system may preferably comprise an SCR converter to achieve efficient NOx reduction.

According to a second aspect of the invention, the above defined object is achieved by a vehicle comprising an internal combustion engine according to any one of the embodiments of the first aspect. The vehicle may for example be a heavy-duty vehicle such as a bus or a truck.

BRIEF DESCRIPTION OF THE DRAWINGS

With reference to the appended drawings, below follows a more detailed description of embodiments of the invention cited as examples.

In the drawings.

Figure 1:
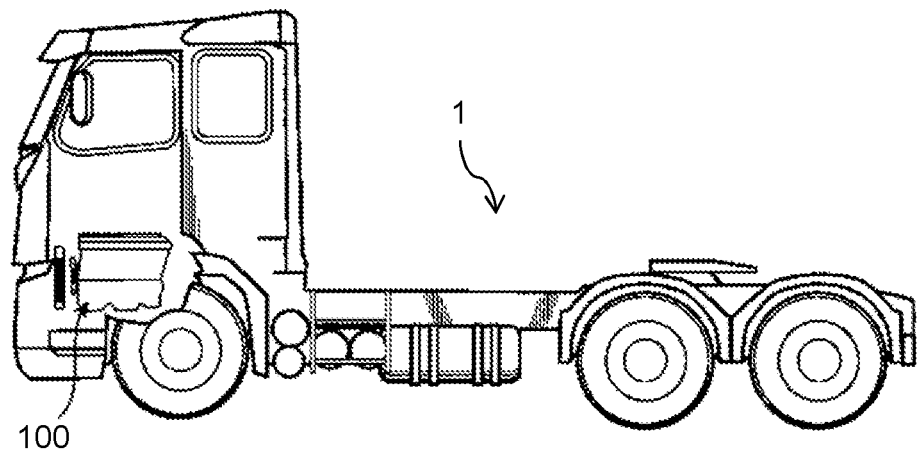
FIG. 1 is a side view of a vehicle comprising an internal combustion engine according to an embodiment of the invention, and FIG. 2 schematically illustrates an internal combustion engine according to an example embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 1 in the form of a heavy-duty truck is schematically shown in FIG. 1. The vehicle 1 is powered by an internal combustion engine 100 according to an example embodiment of the invention.

Figure 2:
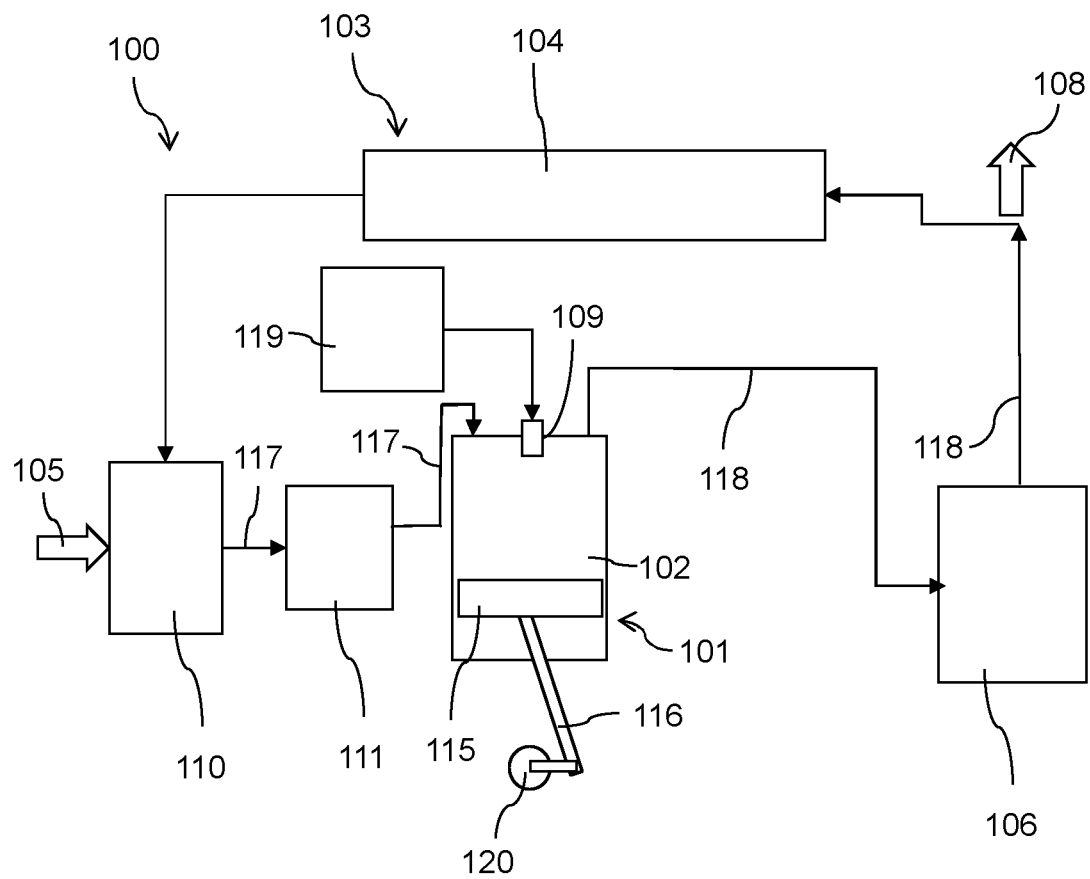

Turning to FIG. 2, the internal combustion engine 100 according to an example embodiment is schematically illustrated. The engine 100 comprises a four-stroke combustion cylinder assembly 101 configured for combustion of a gaseous fuel, such as hydrogen gas, within a combustion chamber 102 of the combustion cylinder assembly 101. A reciprocating piston 115, arranged for reciprocating motion between a top dead centre (TDC) and a bottom dead centre (BDC), is provided within the combustion cylinder. The piston 115 is connected to a connecting rod 116 which drives a crankshaft 120 of the engine 100. In the illustrated embodiment, for simplicity, the combustion cylinder assembly 101 is illustrated as having a single combustion cylinder, although of course the engine 100 may comprise a plurality of combustion cylinders, each being connected to the crankshaft 120 via a piston and a connecting rod, respectively. A hydrogen tank 119 is provided for storage of compressed hydrogen gas or liquid hydrogen, and a fuel injector 109 is provided for injection of the hydrogen gas into the combustion chamber 102. An ignition means (not shown) for initiating combustion of the hydrogen gas within the compression chamber 102 may be provided, depending on the configuration of the engine 100.

An air intake 105 is provided for intake of ambient air into an intake passage 117 of the engine 100. The intake passage 117 is configured for feeding intake gas into the combustion chamber 102 via a displacement compressor 110 provided upstream of the combustion chamber 102. A turbo compressor 111 is in the shown embodiment provided downstream of the compressor 110, fluidly connecting the displacement compressor 110 and the combustion chamber 102, although such a turbo compressor may also be omitted. The intake passage 117 may also comprise one or more intake gas chambers (not shown) for cyclic storage of intake gas. The intake gas chamber(s) may receive compressed intake gas from the displacement compressor 110, and if present from the turbo compressor 111, and deliver it to the combustion cylinder 102 at an intake stroke of the piston 115.

Downstream of the combustion chamber 102, an exhaust passage 118 is provided, via which exhaust is fed to an exhaust outlet 108 during operation of the engine 100. An exhaust gas recirculation (EGR) system 103 is however also provided downstream of the combustion chamber 102, which is configured for feeding a portion of the exhaust to the displacement compressor 110. Thus, the intake gas that is fed to the combustion chamber 102 via the intake gas passage 117 comprises a mixture of air and exhaust from the EGR system 103. The EGR system 103 comprises in the shown embodiment a heat exchanger 104 configured for cooling of the exhaust gases to a desired temperature.

In the shown embodiment, an expander 106 is provided in the exhaust passage 118, fluidly connecting the combustion chamber 102 and the EGR system 103. In the shown embodiment, the expander 106 may be a turbine of the turbo compressor 111. The expander may also be a piston expander, or both a piston expander and a turbine may be provided.

An electronic control unit (ECU, not shown) may be provided for controlling the operation of the engine 100. The control unit may for example be configured to control, directly or indirectly, the injection of fuel via the fuel injector 109. The control unit may also be configured for opening and closing of various inlet valves and outlet valves (not shown) of the engine 100, e.g. to regulate the flow of exhaust via the EGR system and the flow of intake gas into the combustion chamber 102. Such valves may alternatively be mechanically operated using e.g. camshafts (not shown). The control unit may be configured to control the fuel injector and the inlet valves so that the air-fuel mixture within the combustion chamber has a requested air-to-fuel ratio, such as to provide lean operating conditions.

During operation of the engine 100, ambient air and recirculated exhaust is sucked into the displacement compressor 110 via the air intake 105 and the EGR system 103, respectively. The air and exhaust are mixed during a first stage of compression and forms an intake gas, which is fed into the turbo compressor 111 and further compressed during a second stage of compression. Thereafter, the compressed intake gas is fed to the combustion chamber 102, where four-stroke combustion takes place, generating mechanical power. The generated exhaust is fed via the exhaust passage 118 to the expander 106, where the pressure and temperature of the exhaust reduce during expansion thereof. A portion of the exhaust is disposed via the exhaust outlet 108, while another portion thereof is fed to the EGR system 103, wherein the exhaust is cooled in the heat exchanger 104. The cooled exhaust, which may e.g. be cooled to a dew point of the exhaust, is thereafter fed to the displacement compressor 110.

It is to be understood that the present invention is not limited to the embodiments described above and illustrated in the drawings; rather, the skilled person will recognize that many changes and modifications may be made within the scope of the appended claims.

The invention claimed is:
1. An internal combustion engine, comprising:
 a four-stroke combustion cylinder assembly configured for combustion of hydrogen gas within at least one combustion chamber of the four-stroke combustion cylinder assembly to drive a crankshaft of the internal combustion engine;
 an intake passage upstream of the four-stroke combustion cylinder assembly and an exhaust passage downstream of the four-stroke combustion cylinder assembly;
 a displacement compressor arranged within the intake passage upstream, the displacement compressor being configured for compression of intake gas;
 an exhaust gas recirculation system configured for recirculating at least a portion of an exhaust from the exhaust passage, the exhaust gas recirculation system being arranged in downstream fluid communication with the four-stroke combustion cylinder assembly and in upstream fluid communication with the displacement compressor, wherein the exhaust gas recirculation system comprises a heat exchanger for cooling of the exhaust at least to a dew point of the exhaust; and
 an expander arranged in downstream fluid communication with the at least one combustion chamber for receiving the exhaust from the at least one combustion chamber, the exhaust gas recirculation system being arranged in downstream fluid communication with the expander.
2. The internal combustion engine according to claim 1, wherein the exhaust gas recirculation system is configured for feeding both condensed exhaust and exhaust gas from the heat exchanger to the displacement compressor.
3. The internal combustion engine according to claim 1, wherein the exhaust gas recirculation system is configured for condensing and detracting at least a portion of the exhaust from the exhaust gas recirculation system prior to reaching the displacement compressor.

4. The internal combustion engine according to claim 3, wherein the exhaust gas recirculation system is configured for recirculating only gaseous exhaust to the displacement compressor.

5. The internal combustion engine according to claim 1, further comprising a turbo compressor provided downstream of the displacement compressor in the intake passage upstream of the internal combustion engine.

6. The internal combustion engine according to claim 1, wherein the four-stroke combustion cylinder assembly is configured for the combustion of the hydrogen gas using a lean air-fuel mixture.

7. The internal combustion engine according to claim 1, further comprising at least one fuel injector for injection of the hydrogen gas into the at least one combustion chamber.

8. The internal combustion engine according to claim 1, further comprising an exhaust gas aftertreatment system arranged in downstream fluid communication with the at least one combustion chamber for receiving an exhaust gas therefrom.

9. A vehicle comprising the internal combustion engine according to claim 1.

10. An internal combustion engine, comprising:
 a four-stroke combustion cylinder assembly configured for combustion of hydrogen gas within at least one combustion chamber of the four-stroke combustion cylinder assembly to drive a crankshaft of the internal combustion engine;
 an intake passage upstream of the four-stroke combustion cylinder assembly and an exhaust passage downstream of the four-stroke combustion cylinder assembly;
 a displacement compressor arranged within the intake passage upstream, the displacement compressor being configured for compression of intake gas;
 an exhaust gas recirculation system configured for recirculating at least a portion of an exhaust from the exhaust passage, the exhaust gas recirculation system being arranged in downstream fluid communication with the four-stroke combustion cylinder assembly and in upstream fluid communication with the displacement compressor, wherein the exhaust gas recirculation system is configured for recirculating only gaseous exhaust to the displacement compressor; and
 an expander arranged in downstream fluid communication with the at least one combustion chamber for receiving the exhaust from the at least one combustion chamber, the exhaust gas recirculation system being arranged in downstream fluid communication with the expander.

11. The internal combustion engine according to claim 10, further comprising a turbo compressor provided downstream of the displacement compressor in the intake passage upstream of the internal combustion engine.

12. The internal combustion engine according to claim 10, wherein the four-stroke combustion cylinder assembly is configured for the combustion of the hydrogen gas using a lean air-fuel mixture.

13. The internal combustion engine according to claim 10, further comprising at least one fuel injector for injection of the hydrogen gas into the at least one combustion chamber.

14. The internal combustion engine according to claim 10, further comprising an exhaust gas aftertreatment system arranged in downstream fluid communication with the at least one combustion chamber for receiving an exhaust gas therefrom.

* * * * *